July 26, 1927.
A. R. McDANIEL
1,637,227
PAN LIFTER
Filed June 18, 1926
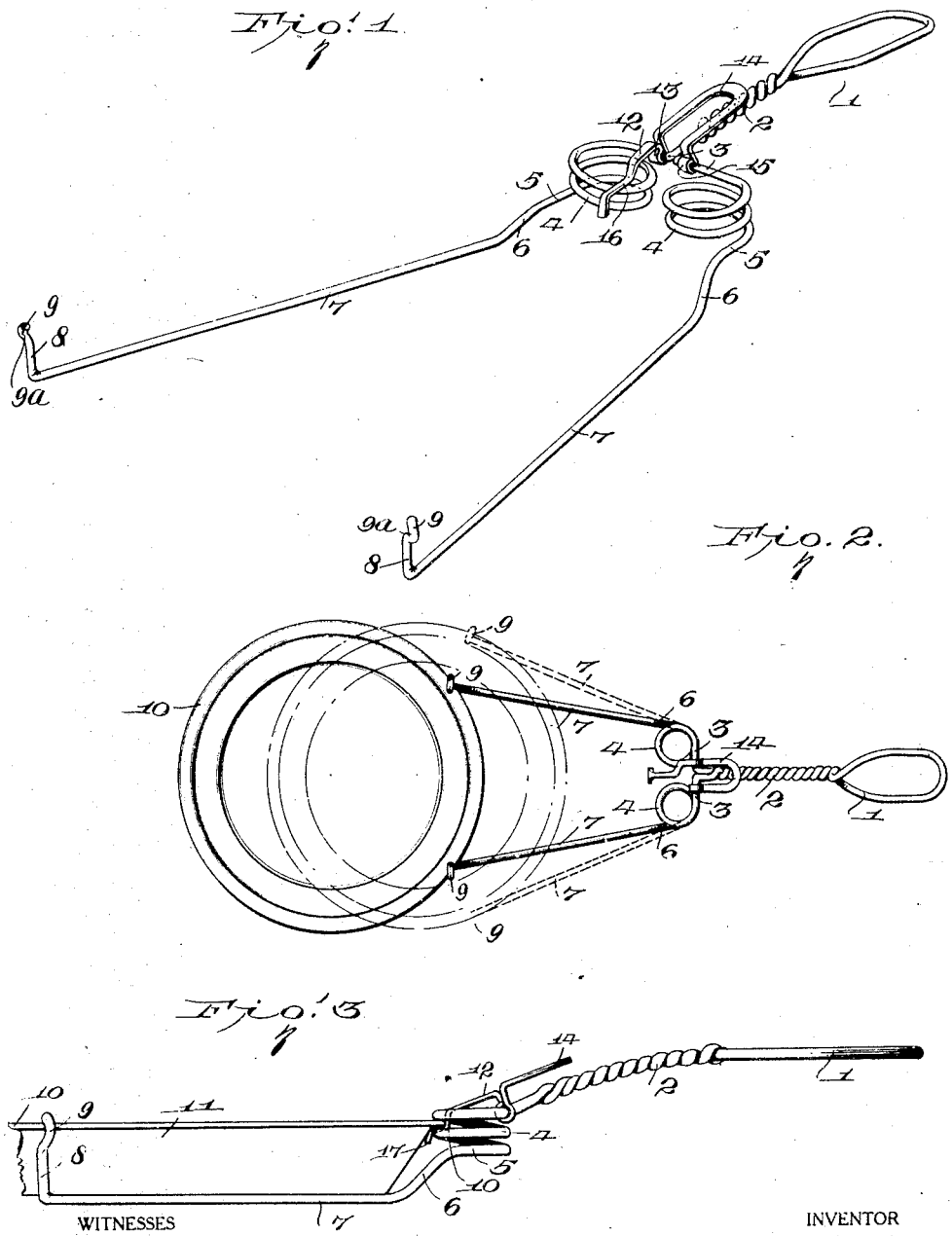
INVENTOR
Albert R. McDaniel
BY
ATTORNEYS
WITNESSES Patented July 26, 1927.

1,637,227

UNITED STATES PATENT OFFICE.

ALBERT R. McDANIEL, OF JOHNSTOWN, NEBRASKA.

PAN LIFTER.

Application filed June 18, 1926. Serial No. 116,925.

My invention is an improvement in pan lifters and it consists in the combinations, constructions and arrangements herein described and claimed.

An object of the invention is the provision of a device for lifting and supporting pie pans or other shallow pans, having outwardly extending edge portions or flanges so that a pan can be lifted by the device while the pan is hot without injury or discomfort to the user of the device.

A further object of the invention is the provision of a lifter of the character described which can be placed in engagement with or disengaged from a pan quickly and easily and which when engaged with a pan will firmly hold the pan so that slipping of the pan from the device is effectually prevented when the pan is being moved by means of the device.

A further object of the invention is the provision of a pan lifter of the character described which is simple in construction, comprises but relatively few parts, and is thoroughly practical commercially.

Other objects and advantages of the invention will be apparent from the following description, considered in conjunction with the accompanying drawings, in which Figure 1 is a perspective view of the improved pan lifter, Figure 2 is a plan view on a smaller scale than Figure 1 of the lifter and a pan which can be lifted by means of the device, the view showing the lifter in full lines at the beginning of the operation of placing the lifter in engagement with the pan and showing in dotted lines the relative positions of the pan and the lifter when the lifter has been placed in engagement with the pan, and Figure 3 is a side elevation of the lifter in engagement with a pan, the pan being shown in vertical section.

The body of the improved lifter is formed of a single length of wire which is bent intermediate its ends to produce two similar members. These members then are bent to produce a handle which comprises the loop 1 and the twisted together portions 2. The aforesaid members of the length of wire are bent laterally in opposite directions at 3 at the inner ends of the twisted portions 2 and are bent at the outer ends of the portions 3 to produce the coils 4, each of which comprises a plurality of vertically spaced convolutions. The portions of the convolutions of the coils 4 which are located at the inner sides of the coils 4 are spaced vertically. The aforesaid members of the length of wire are bent to extend forwardly and outwardly at 5 from the outer sides of the lowermost convolutions of the coils 4, then downwardly and forwardly at 6 then forwardly and slightly outward at 7 then upwardly at 8 and finally the extreme end portions of the members of the aforesaid length of wire are curved outwardly and upwardly to produce the gripping hook members 9. The members 7 are relatively long and may be termed supporting arms having the upturned portions 8 at their outer ends. The members 9 may be termed jaws on the upturned outer end portions of the supporting arms 7 and it will be observed that these members 9 are curved to produce seats at the inner or adjacent sides of the jaws 9, as indicated at 9ª for the reception of portions of the outwardly turned rim flange or edge portion 10 of a shallow pan 11 which may be a pie pan or other bake pan. The members 4 also may be termed pan rim engaging members since adjacent convolutions of each of the members 4 are adapted to grip a portion of the rim flange of a pan when such rim flange has been inserted between adjacent convolutions of the member 4. The members 5 constitute connecting members between the pan rim engaging members 4 and the upwardly and rearwardly inclined end portion 6 of the supporting arms and the members 3 serve as connectors between the upper convolutions of the coils 4 and the inner ends of the handle members.

The device also includes a releasing finger 12. The releasing finger 12 is connected by an eye member 13 with one of the arms of a substantially U-shaped finger operating member 14. The end portion of the other arm of the substantially U-shaped finger operating member 14 is bent to produce an eye member 15 similar to the eye member 13 and the eye members 13 and 15 are arranged to encircle the respective portions 3 of the body of the device so that the finger operating member 14 will be disposed above the twisted portions 2 of the handle members. The forward end portion of the releasing finger 12 is offset laterally at 16 with respect to the remainder of the releasing finger 12 so that this forward end portion of the releasing finger 12 lies in a vertical plane that is located midway between the coils 4. The extreme forward end portion of the releasing finger 12 is turned downwardly and forwardly at 17 to extend under and to engage with the rim flange 10 of the pan 11 when portions of the rim flange 10 of the pan are disposed between convolutions of the coils 4 and the finger operating member 14 has been swung upwardly from the handle of the body of the device to the position shown in Figure 3. The members 12, 13, 14, 15 thus may be said to comprise a releasing lever which is fulcrumed intermediate its length on the handle of the body of the device and is adapted to be actuated by downward pressure on the member 14 to disengage the rim flange of the pan from the coils 4.

From the foregoing description of the various parts of the device, the operation thereof may be readily understood. The device is adapted particularly for use in removing hot pie or bake pans from ovens. To apply the device, the handle 1—2 is grasped and the device is placed in the position shown by the full lines in Figure 2 with respect to a pan that is to be lifted, the seats 9ª of the pan rim engaging jaws being in sliding contact with the edge of the rim flange of the pan and the handle of the body of the device being substantially in line with a radius of the pan. The handle of the device then is pushed in the direction of its length toward the pan and the jaws 9 will slide along the edge of the rim flange of the pan, the arms 7 being spread to permit such sliding movement of the jaws 9 from the edge of the rim flange of the pan. The portion of the rim flange of the pan at the side of the latter next to the handle of the device will enter the space between adjacent convolutions of the coils 4 and at that time the supporting arms 7 will extend underneath the bottom of the pan and the jaws 9 will be engaged with the rim flange of the pan at the side of the latter opposite to the handle. The finger operating portion or handle of the aforesaid releasing lever may be actuated, as by the thumb of the hand that grasps the handle of the body of the device and the forward end portion of the clamping lever will be swung upwardly against the rim flange 10 when desired to disengage the pan from the coils 4 and to permit removal of the device from the pan without there being any necessity of the hand of the operator touching the pan. It thus will be observed that the coils 4 in addition to serving as pan flange engaging members, also serve as springs to permit spreading of the supporting arms 7 of the device when the device is applied to a pan and to urge the jaws 9 at the forward ends of the supporting arms 7 continuously against the edge of the rim flange of the associated pan when the arms 7 have been spread from their normal positions.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A pan lifter comprising a pair of supporting arms adapted to extend across the bottom of a pan underneath the pan, means at the outer ends of said arms for engaging with the rim edge of the pan, coil springs joined to the inner ends of said supporting arms, and a handle connected with said coil springs.

2. A pan lifter comprising a pair of supporting arms adapted to extend across the bottom of a pan underneath the pan, means at the outer ends of said arms for engaging with the rim edge of the pan, coil springs joined to the inner ends of said supporting arms, a handle connected with said coil springs, and a releasing lever fulcrumed intermediate its length on said handle and including a finger portion adapted to swing to and from position to contact with the outer wall of a rim portion of the pan on said supporting arms.

3. A pan lifter comprising a pair of supporting arms adapted to extend across the bottom of a pan underneath the pan, means at the outer ends of said arms for engaging with the rim edge of the pan, and coiled springs joined to the inner ends of said supporting arms, and a handle connected with said coiled springs, said coiled springs being vertically disposed and being adapted to engage with the rim edge of said pan to cooperate with the rim edge engaging means at the outer ends of the supporting arms to retain said pan in place on said supporting arms.

4. A pan lifter comprising a pair of supporting arms adapted to extend across the bottom of a pan underneath the pan, means at the outer ends of said arms for engaging with the rim edge of the pan, coil springs joined to the inner ends of said supporting arms, and a handle connected with said coil springs, said handle being formed of portions of a single length of wire, the outer end portion of the handle being in loop form and the inner end portion of the handle comprising twisted together portions of wire.

5. A pan lifter comprising a pair of supporting arms adapted to extend across the bottom of a shallow bake pan underneath the pan, said arms diverging slightly from their inner ends toward their outer ends, the outer end portions of said arms being turned upward and having outwardly and upwardly curved jaw members for engaging with the edge portion of a rim flange on said pan, a pair of vertically disposed coil springs having their lowermost convolutions joined to the inner ends of said supporting arms, said coil springs being disposed above the level of the main portions of the supporting arms, and a handle joined to the uppermost convolutions of said coil springs, said coil springs being adapted to engage with the rim edge portion of said pan at the side of the latter opposite to said first named rim edge engaging portions of the device.

6. A pan lifter comprising a body formed of a single length of wire, said length of wire being bent intermediate its ends to provide two similar portions, said portions of the length of wire being bent to provide a handle consisting of an outer end portion of loop form and an inner end portion comprising twisted together portions of the wire, said first named or main portions of the length of wire being further bent at the inner ends of the twisted members of the handle to produce a pair of vertically disposed coiled springs and a pair of slightly divergent supporting arms extending from the lowermost convolutions of the coiled springs, the uppermost convolutions of the coiled springs being connected with the members of the twisted portion of the handle and the lowermost convolutions of the coiled springs being extended at the outer sides of the coiled springs forwardly and then downwardly and being joined to said supporting arms, the extreme outer end portions of the supporting arms being turned upwardly and then curved outwardly and upwardly to produce hook-like jaw members for engaging with the rim edge portion of a pan, said convolutions of the coil springs also being adapted to engage with the rim edge of said pan, and a releasing lever fulcrumed intermediate its length on the extended end portions of the upper convolutions of said coil springs and including a finger extending forwardly midway between said coil springs for part of its length, the extreme forward portion of said finger being turned downwardly and forwardly to engage under the adjacent portion of the rim of the pan.

7. A pan lifter comprising a pair of supporting arms adapted to extend underneath the bottom of a shallow pan and having pan rim engaging members at their outer ends, a pair of vertically disposed coil springs joined to the inner ends of said supporting arms, said coil springs being adapted to engage with the rim edge portion of said pan, a handle having a pair of oppositely turned lateral members joined to the upper convolutions of said coil springs, and a releasing lever comprising a substantially U-shaped handle portion having depending eye members at the ends of the arms of said U-shaped handle portion encircling said oppositely turned lateral members at the forward end of the handle, said lever also including a forwardly extending releasing finger joined to one of said eye members, the forward end portion of said clamping finger being offset laterally to lie in a plane midway between said coil springs, said releasing finger being turned downwardly and forwardly in advance of said coil springs.

8. A pan lifter comprising supporting arms having means at one extremity for engaging a pan rim at one side, coils at the other extremity of the arms for engaging said pan rim at the other side, a handle joining the arms, and means movably carried by the handle for disengaging the pan rim from the coils.

ALBERT R. McDANIEL.